United States Patent [19]

Sano

[11] 4,374,187
[45] Feb. 15, 1983

[54] COVER APPARATUS IN MONOBLOCK STORAGE BATTERY

[75] Inventor: Ichiro Sano, Yokohama, Japan

[73] Assignee: The Furukawa Battery Co., Ltd., Kanagawa, Japan

[21] Appl. No.: 142,059

[22] PCT Filed: Dec. 1, 1978

[86] PCT No.: PCT/JP78/00034

§ 371 Date: Nov. 1, 1979

§ 102(e) Date: Nov. 1, 1979

[30] Foreign Application Priority Data

Mar. 4, 1978 [JP] Japan ............................. 53-26992[U]

[51] Int. Cl.³ ............................................. H01M 2/08
[52] U.S. Cl. ...................................... 429/175; 429/88
[58] Field of Search .................... 429/175, 176, 86, 88

[56] References Cited

U.S. PATENT DOCUMENTS

| | | | |
|---|---|---|---|
| 3,597,280 | 8/1971 | Hennen | 429/88 |
| 3,647,556 | 3/1972 | Cox | 429/175 X |
| 3,772,088 | 11/1973 | Hennen et al. | 429/88 X |
| 3,879,227 | 4/1975 | Hennen | 429/88 X |
| 4,107,398 | 8/1978 | Lindenberg | 429/175 X |
| 4,207,387 | 6/1980 | Jutte | 429/88 |

Primary Examiner—Charles F. Lefevour
Attorney, Agent, or Firm—Leydig, Voit, Osann, Mayer & Holt, Ltd.

[57] ABSTRACT

A cover apparatus in a monoblock storage battery of the type in which the underside surface of the battery cover is provided with cell partition walls for defining a plurality of cell chambers. The underside surface of the cover is further provided with mutually facing walls crossing transversely the cell partition walls and a cover wall on the lower surface thereof which defines an exhaust passage duct common to the plurality of cell chambers which permits the escape of gas generated in the cell chambers while effectively preventing leakage of electrolyte from the battery during gas venting.

10 Claims, 17 Drawing Figures

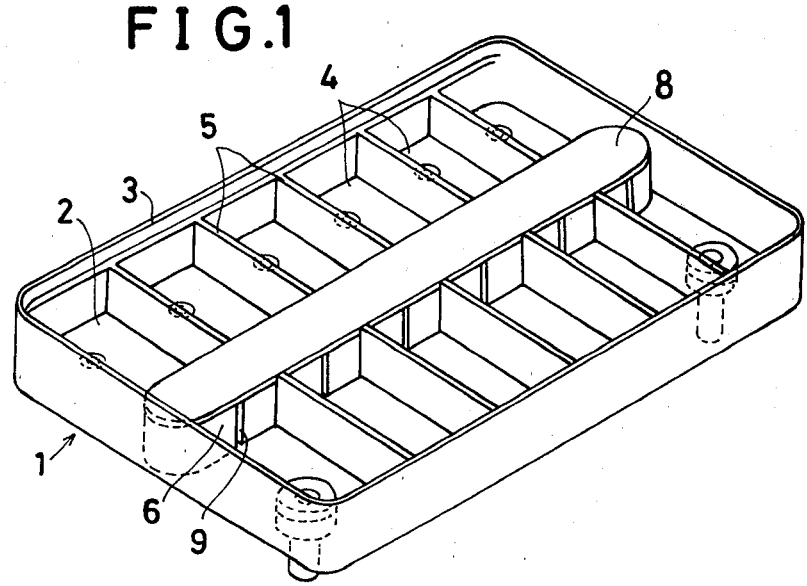
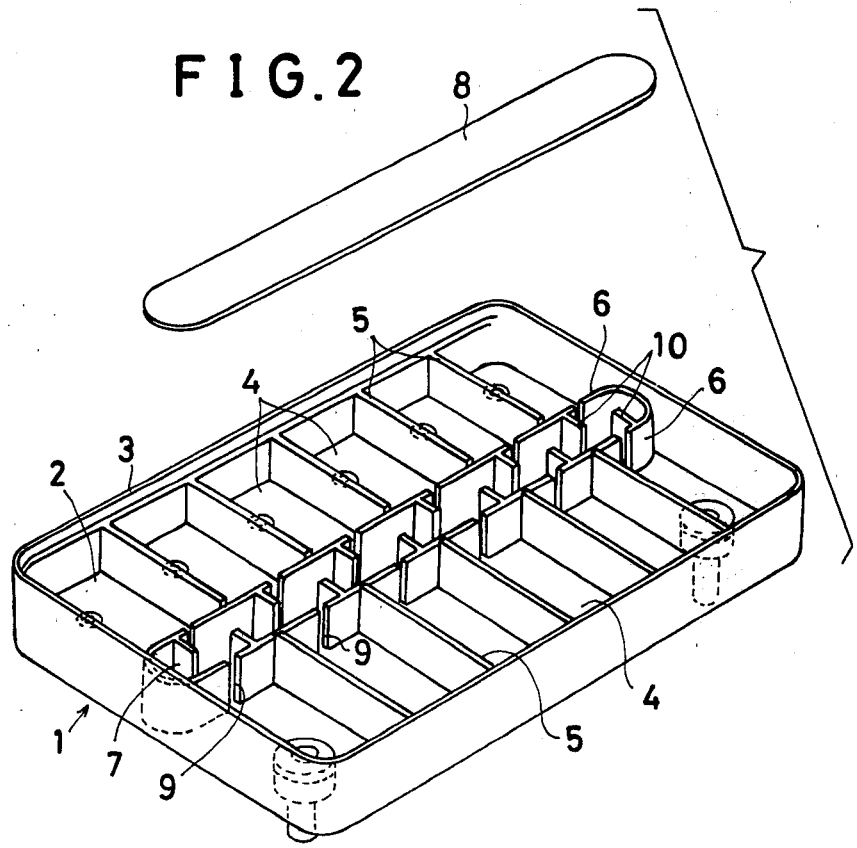

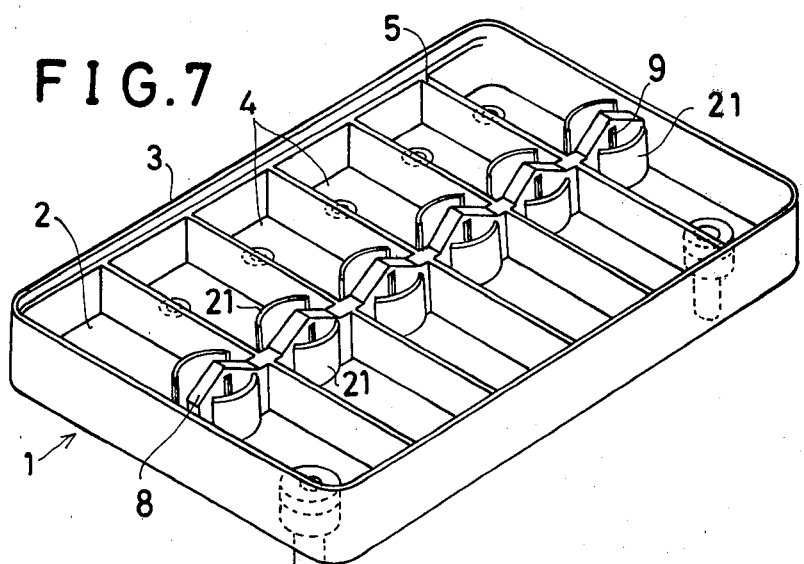
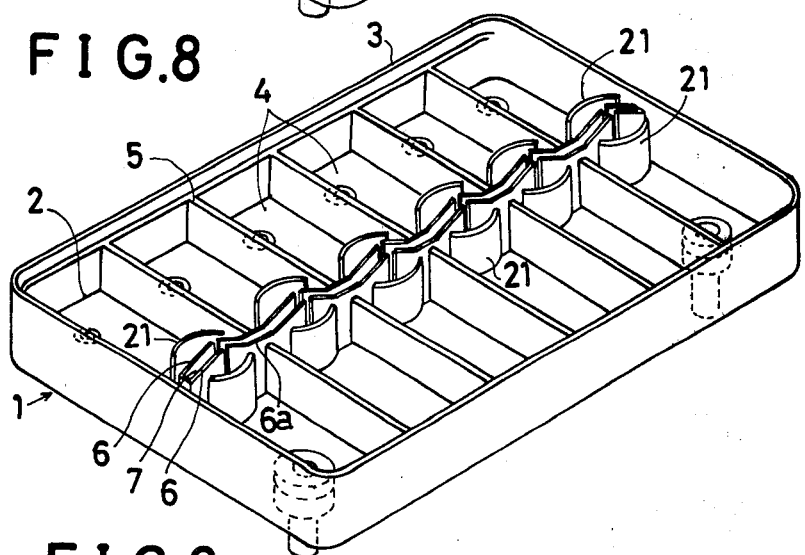
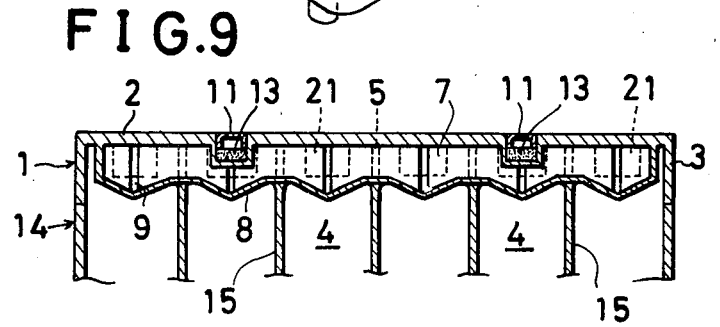

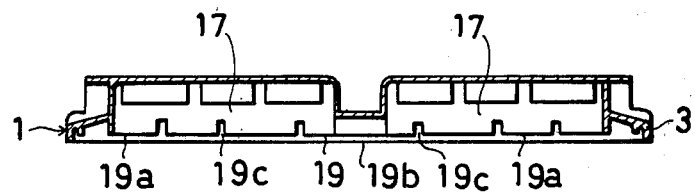
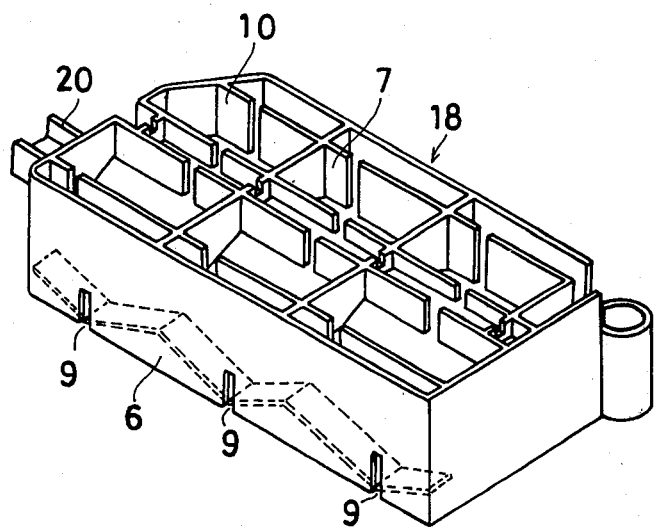
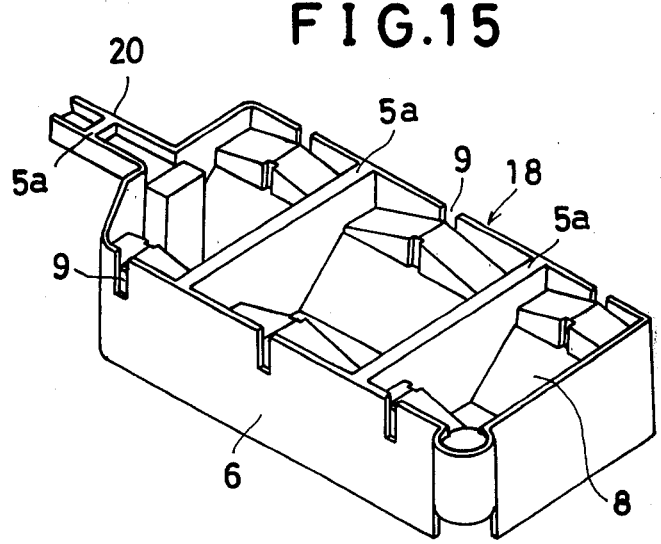

COVER APPARATUS IN MONOBLOCK STORAGE BATTERY

TECHNICAL FIELD

This invention relates to a cover apparatus for venting gas generated in cell chambers to the exterior through a common exhaust passage in a monoblock storage battery of the type that the interior thereof is divided by partition walls into plural cell chambers.

BACKGROUND ART

A conventional cover apparatus in this kind of battery is such that a top wall of a cover thereof is formed with holes which are in communication with respective cell chambers, and a grooved frame body a channel shape in section is fixed to the outer surface thereof by an adhesive agent or by heat melting adhesion or the like to form an exhaust passage common to these cell chambers, and consequently the same has such inconveniences that there is such a fear that the fixed portion thereof peels off or electrolyte in the interior thereof leaks out to the outer surface of the cover through that portion, and that the same is deteriorated in appearance by the fixed portion.

DISCLOSURE OF THE INVENTION

An object of this invention is to provide a cover apparatus in this kind of storage battery which is free from such inconveniences, and it is characterized in that a rear surface of a top wall of a cover is provided with cell partition walls for partitioning into plural cell chambers, mutually facing walls crossing the cell partition walls, and a cover wall covering the lower surface of a space passage formed between the facing walls, so that the interior thereof is formed into an exhaust passage common to plural cell chambers.

Thus, by the foregoing invention, there can be provided such a cover apparatus that the same is free from any leakage of electrolyte to the outside surface of the top wall of the cover and is good in appearance.

BRIEF DESCRIPTION OF THE FIGURES IN THE DRAWINGS

FIG. 1 is a perspective view of one embodying example of this invention,

FIG. 2 is an exploded view of the same,

Figure 3:
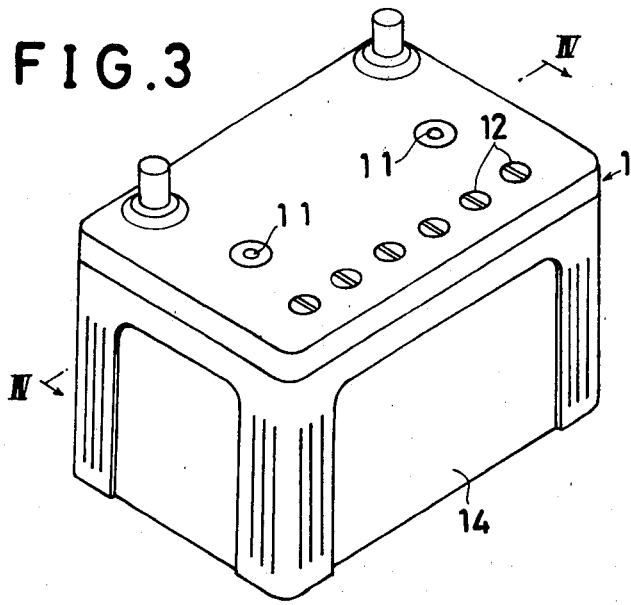
Figure 4:
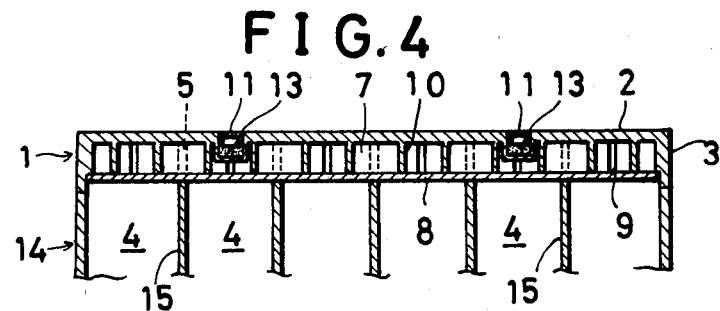
Figure 5:
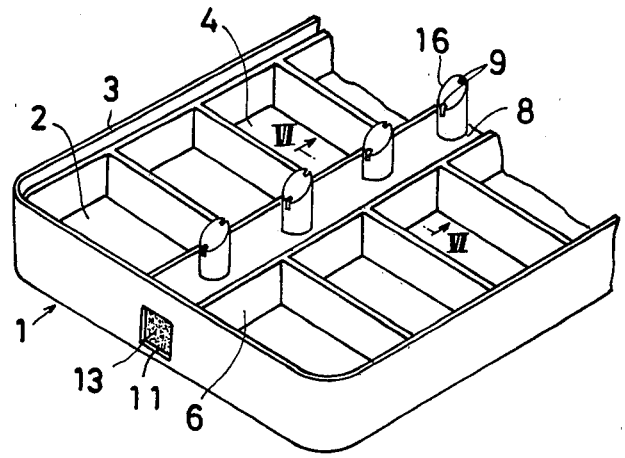
Figure 6:
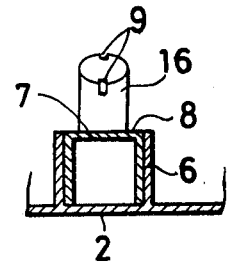
Figure 10:
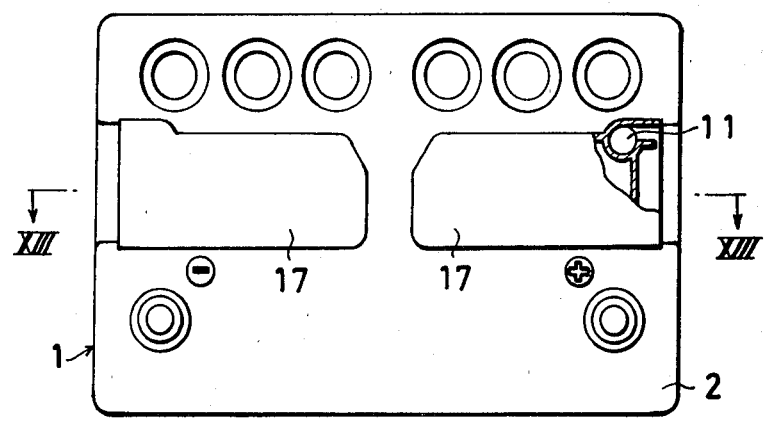
Figure 11:
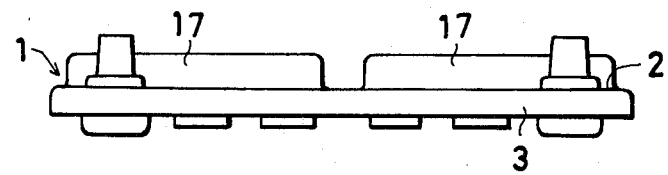
Figure 12:
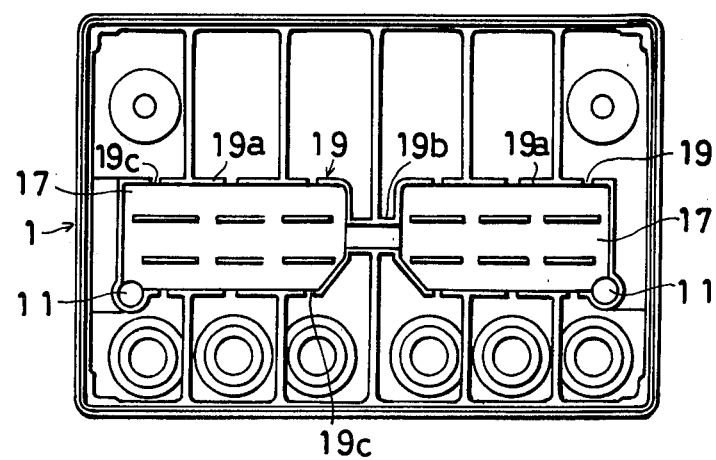
Figure 16:
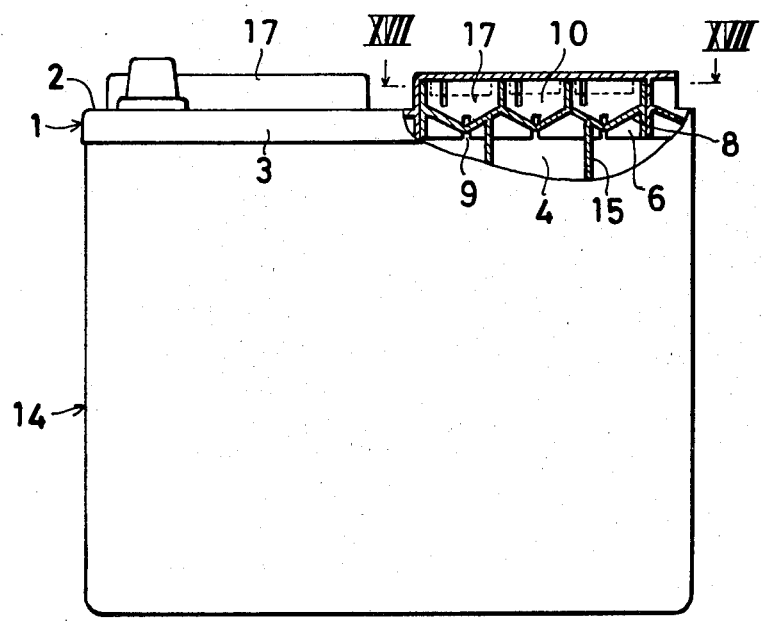
Figure 17:
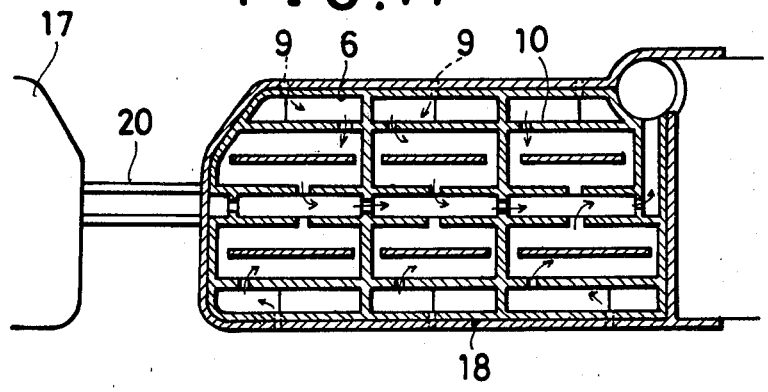

FIG. 3 is a perspective view of such a use condition thereof that the same is liquid-tightly applied to a battery container, FIG. 4 is a sectional view taken along the line IV—IV in FIG. 3, FIG. 5 is a perspective view of a part of another embodying example thereof, FIG. 6 is a sectional view taken along the line VI—VI in FIG. 5, FIG. 7 is a perspective view of further another example thereof, FIG. 8 is a perspective view of the same before being finished, FIG. 9 is a sectional view of the same in such a use condition thereof that the same is liquid-tightly applied to a battery container, and FIGS. 10 to 17 show further modified example thereof; FIG. 10 is a top plan view of a cover thereof, FIG. 11 is a side view of the same, FIG. 12 is a rear view of the same, FIG. 13 is a sectional view taken along the line XIII—XIII, FIG. 14 is a perspective view of a housing for venting gas viewed from the reverse side thereof, FIG. 15 is a perspective view of the same viewed from the reverse side thereof, FIG. 16 is a side view, partly in section, of a modified example comprising an assembly of a cover and housing in such a condition that the same is applied integrally to a battery container, and FIG. 17 is a sectional view taken along the line XVII—XVII in FIG. 16.

BEST MODE FOR CARRYING OUT THE INVENTION

FIG. 1 shows one embodying example of this invention, and numeral 1 denotes a battery cover formed, by molding out of thermoplastic synthetic resin, for instance, polyproplyline as material, and the cover 1 is not different from a conventional cover in that the same is provided with a flat top wall 2, a peripheral side wall 3 bent downwards on the outer periphery thereof and plural partition walls 5 extending in the width direction on the underside surface thereof for partitioning the interior thereof into plural cell chambers 4, but according to this invention, there are provided a pair of mutually facing walls 6, 6 projecting from the rear surface of the cover and extending across these partition walls 5, and thereby there is formed therebetween an exhaust passage 7 which is composed of a channel-shaped groove and is in common to the respective cell chambers 4, 4.

It is general and preferable that these facing walls 6, 6 are formed on molding of the cover as shown in FIG. 2, and thereby manufacturing of the channel-shaped exhaust passage becomes easy and economical, and also they can be obtained with durable ones combined integrally with the cover top wall 2 and these partition walls 5.

A cover wall 8 of a long plate form made of thermoplastic synthetic resin such as polypropylen or the like is secured to upper edges of the facing walls 6, 6 by heat melting adhesion, an adhesive agent or the like so as to cover the lower surface of the groove passage formed between the facing walls 6, 6, whereby there is formed an exhaust passage 7 composed of a conduit pipe.

The pair of facing walls 6, 6 are previously molded to become lower than the height of the partition wall 5 by a thickness of the cover plate 8 as shown in FIG. 2, so that when they are covered with the cover wall 8, there is obtained such a level surface that the outer surface of the cover wall 8 levels with the partition walls 5 as shown in FIG. 1, and consequently when this cover is applied to a monoblock battery container, there can be obtained a monoblock battery in which the cover can be fixed liquid-tightly over the whole length of the partition walls of the battery container.

The facing walls 6, 6 are formed with communication openings 9 corresponding to the respective cell chambers 4, whereby the interior of the exhaust passage 7 is formed into an exhaust passage common to the respective cell chambers 4. The communication openings 9 can be formed so that, on molding, the facing walls 6, 6 may be formed to be lacking at positions of the respective cell chambers 4 as shown in FIG. 2. Referring to the drawings, numeral 10 denotes baffle plates projecting in an alternate-arrangement fashion from the inner surfaces of the facing walls 6, 6 towards the interior of the groove 7, and thereby the vent gas passing through the groove 7 is vented while flowing against and around the same and as a result prevents as much as possible the mist of electrolyte escaping to the atmosphere.

The common exhaust passage 7 is provided therein with a vent opening 11 having a filter and made, for instance, in the cover top surface, so that vent gas escapes therethrough to the exterior.

Numeral 12 denotes a liquid charging plug provided for each cell chamber 4, and numeral 13 denotes a gas filter mounted in the vent opening 11.

This invention cover apparatus thus constructed is, in an usual manner, fixed liquid-tightly to a battery container 14 of thermoplastic material such as of polypropylene or the like, as shown in FIGS. 3 and 4, by heat melting adhesion, an adhesion agent or the like, between their mutual opposite peripheral edges and respective partition walls, so that there is obtained such a monoblock storage battery that there are formed therein the cell chambers 4 of which any adjacent chambers are isolated one from another. Battery elements in the interior thereof are not illustrated for the sake of convenience. In this case, it is of course that the surface of the cover wall 8 is fixed liquid-tightly to crossing or transverse portions of the respective cell partition walls 15 of the battery container 14.

At the time of use of the battery, gas generated in each cell chamber 4 enters the common exhaust passage 7 through each communication opening 9, and is vented from the exhaust opening 11, while entrapped acid electrolyte mist is being removed therefrom.

The battery cover 1 does not have such openings communicating with the exterior and corresponding to each cell chamber as in the conventional one, so that there is no leakage of the electrolyte in the battery. Additionally, the same does not have such fixed portion as in the conventional one, so that there can be obtained a battery cover in which the cover top surface thereof is good in an appearance thereof.

FIGS. 5 and 6 show another embodying example of this invention, and the communication opening 9 is provided in a tubular body 16 projecting downwards from the cover wall 8. The facing walls 6, 6 are so constructed as to be on a level with the partition walls 5, and the cover wall 8 is formed into such a channel-shape in section that is adapted to be mounted in the groove 7 and be on a level with height of the facing walls 6, 6, so that the outer surface thereof is on a level with the facing walls 6, 6 and the cell partition walls 5, and consequently there can be ensured the liquid tightness thereof with the battery container partition walls at such crossing portions of the cover wall 8 surface that cross the partition walls 5. The channel-shaped cover wall 8 is mounted tightly in the groove 7 or is mounted and fixed through an adhesive agent.

The exhaust opening 11 with the gas filter 13 is provided in one end of the peripheral side wall of the cover 1, so that the top wall 2 thereof is formed into a wall surface which has no exhaust opening 11.

FIG. 7 shows further another embodying example, and the cover wall 8 is formed by heat melting of the facing walls 6, 6. This provides such a convenience that a heating operation on the peripheral edge and the partition walls of the cover by means of a hot plate which is used in a heat melting work between the battery cover and the battery container effected thereto is utilized and thus simultaneously with this work the facing walls 6, 6 can be melted together by the heat to form the cover wall 8.

For this purpose, as shown in FIG. 8, the facing walls 6, 6 are previously formed to be of such upwardly projections that the same have excessive height portions 6a, 6a enough to form the cover wall by heat melting them. This excessive height of the facing wall is required to be provided at least at its position corresponding to the partition wall 5. Though not illustrated, the heating plate is formed into a corresponding shape suitable for fusing the same.

The cover wall 8 thus formed is so prepared that each crossing portion thereof with the partition wall 5 may be substantially on a level with the height of the partition wall 5 as shown in FIG. 7. Further, the facing walls 6, 6 are previously so formed that, as shown in FIG. 8, the same project into a mountain form at a position corresponding to each cell chamber 4 and have the communication opening 9 at its top portion, so that the bottom surficial cover wall 8 thus formed serves to become the lowest valley portion at each communication opening 9 portion in such a use condition as shown in FIG. 9. Consequently, the same has such an advantageous effect that, in use thereof, the electrolyte retained in the conduit pipe 7 is facilitated in its flowing back to the interior of the cell chamber 4 through the communication opening 9.

Referring to the drawings, numeral 21 denotes an obstructing plate provided on the outside of the communication opening 9 so that the same may prevent as much as possible mist of the electrolyte from flowing into the exhaust passage 7.

All of the foregoing embodying examples show such cases that the facing walls 6, 6 are formed by molding on the underside surface of the cover 1, but, alternatively, the facing walls 6, 6 may be formed separately from the cover 1 and be fixedly attached to the rear underside surface of the cover 1 by heat melting adhesion, and adhesive agent or the like. Further it may be possible that a grooved frame assembly comprising the facing walls 6, 6 and the cover wall 8 is previously prepared and the frame assembly is fixedly provided to the underside surface of the cover 1.

The cover 1 is not limited to one in which the top wall 2 thereof is formed into a flat plane as shown in the foregoing embodying examples, but such a modified one can be also adopted that the same has an uneven surface by projecting part of the top wall 2 upwards.

FIGS. 10 to 17 show further another embodying example of this invention, and part of the top wall 2 of the battery cover 1 is swelled out upwards, and thereby the underside surface 2 thereof is formed with two hollow chambers 17, 17 each extending across plural cell chambers 4, and a frame-shaped assembly 18 comprising the facing walls 6, 6, the cover wall 8 and the communication openings 9 corresponding to the respective cell chambers 4 as shown in FIGS. 14 and 15 is mounted in each thereof, so that the internal space of each assembly 18, accordingly, the space in each hollow chamber 17 is formed into the exhaust passage 7 common to these plural cell chambers 4 through the respective communication openings 9. Consequently, the interior of the hollow chamber 17 is utilized as an effective space for venting gas and at the same time the cover 1 is increased in its mechanical strength at each hollow chamber 17 portion. Each hollow chamber 17 is provided at a corner thereof with the vent opening 11. The underside surface of the top wall 2 of the cover 1 is provided with a common surrounding frame 19 projecting therefrom for making mutual communications between the right and left hollow chambers 17, 17. The surrounding frame 19 comprises right and left peripheral frames 19a, 19a extending along the lower surface openings of the hollow chambers 17 and the exhaust openings 11 on the right and left sides and being equal in shape one to another, and an intermediate groove frame 19b for making mutual communications between the two peripheral frames 19a, 19a, and the lower edges of the two peripheral frames 19a, 19a are formed with cut-off openings 19c corresponding to the respective cell chambers 4 and in alignment with the respective communication openings 9 made in the foregoing assemblies 18. The two assemblies 18, 18 to be mounted in the two hollow chambers 17, 17 are formed with surrounding frames which are identical in outline shape with and adapted to come into contact with the two peripheral frames 19a, 19a and are interconnected through an intermediate connecting groove frame 20 in a shape in section to be mounted in the foregoing groove frame 19b. The two peripheral frames 19a, 19a each has at its one corner an exhaust opening frame portion having the gas filter 13 therein. Thus, if the pair of frame-shaped assemblies 18, 18 thus constructed are mounted in the hollow chambers 17, 17, the internal exhaust passages 7, 7 in the two assemblies 18, 18 become mutual communications through the surrounding frame 19.

Accordingly, when either one of the exhaust passages 7, 7 has such a trouble that the gas filter 13 of the exhaust opening 11 is clogged with any foreign matter or the like, there is brought about such an advantage that gas can be vented from the other exhaust passage 7 and it is kept safe. Each assembly 18 is detachably mounted in the hollow chamber 17 or is mounted and attached by an adhesive agent or the like.

The interior of the exhaust passage 7 above the cover wall 8 of each assembly 18 is provided with a large number of baffle plates 10 extending longitudinally and laterally, so that during the time when the gas passing through the exhaust passage 7 is being vented from the vent opening 11, the gas flows against these large number of obstructing plates 10 and consequently electrolyte mist contained therein is caught so as not to be discharged to the exterior.

The cover wall 8 may be sufficient with a simple flat wall, but it is preferable that, as illustrated, the same is formed into such a mountain-shaped bottom wall that it is high at its center and is gradually lowered towards the facing walls 6, 6 side on its both sides having both sides communication openings 9, whereby flowing back of the retained electrolyte into the cell chambers 4 is facilitated. Further, the rear surface of the top wall within the hollow chamber 17 on the cover 1 side is provided with the obstruction plates 10, so that at the time of mounting of the assembly 18 therein the space of the exhaust passage 7 thereof is further finely divided, whereby mist-catching function thereof can be increased.

The communication openings 9 each is shown with one formed by that the lower edge of the facing wall 6 is cut off and the cut-off portion is extended long beyond the upper surface of the cover wall 8 so as to be in communication with the interior of the exhaust passage 7, but the same may be modified into such a hole made in the cover wall 8 that makes communications between the cell chamber 4 on its lower surface and the common exhaust passage 7 on its upper surface.

The lower surface of the cover wall 8 is provided with cell partition wall portions 5a projecting therefrom so as to be corresponded to the cell partition walls of the monoblock battery container, and a similar cell partition wall portion 5a is provided also on the lower surface of the interior of the foregoing groove frame 20.

Thus, the cover apparatus obtained by mounting the assemblies 18, 18 of the foregoing construction in the hollow chambers 17, 17 on the underside surface of the cover 1 is applied liquid-tightly to the monoblock battery container 14 as shown in FIGS. 16 and 17 so as to obtain a monoblock storage battery.

Thus, the gas generated in each cell chamber 4 of the battery enters the common exhaust passage 7 on the upper surface of the cover wall 8 through the communication openings 9 and is vented to the exterior from the vent opening 11, while acid mist thereof being removed.

Thus, according to this invention, a cover apparatus is so constructed that the underside surface of the battery cover is provided with the exhaust passage common to the respective cell chambers, and consequently it is entirely removed that the electrolyte is leaked out to the outer surface of the cover as in the conventional one, and there can be provided a battery cover which is good in appearance.

What is claimed is:

1. A cover apparatus in a monoblock battery comprising a top wall having an underside surface, a plurality of cell partition walls depending from said top wall underside surface defining a plurality of cell chambers, mutually facing walls crossing said cell partition walls, a cover wall associated with said facing walls for defining on the underside of said top wall an exhaust duct common to said plurality of cell chambers, and said duct being formed with openings communicating with respective of said cell chambers whereby exhaust gas generated in the cell chambers flows through the respective duct openings into said common exhaust duct and thereupon to the atmosphere.

2. A cover apparatus as claimed in claim 1, wherein the facing walls are integrally molded with the battery cover.

3. A cover apparatus as claimed in claim 1, wherein the facing walls are formed separately from the battery cover and are secured thereto by an adhesive agent.

4. A cover apparatus as claimed in claim 1, wherein the cover wall is secured to the facing walls by an adhesion agent.

5. A cover apparatus as claimed in claim 1, wherein the cover wall is formed by thermal fusion of the upper edges of the facing walls.

6. A cover apparatus as claimed in claim 1, wherein the facing walls and the cover wall are previously prepared as an assembly, and said assembly is secured by an adhesive agent or the like.

7. A cover apparatus as claimed in claim 1, wherein a top wall of the battery cover defines a flat plane.

8. A cover apparatus as claimed in claim 1, wherein the top wall of the battery cover is partly swelled out upwardly to define a portion of said duct.

9. A cover apparatus as claimed in claim 1, wherein the underside surface of the top wall of the battery cover is formed with a hollow chamber extending across a plurality of said cell chambers by swelling upwards part of the top wall, and a separate assembly comprising said facing walls and the cover wall is mounted upon said hollow chamber portion of said top wall.

10. A cover apparatus in a monoblock battery comprising a top wall having an underside surface, a plurality of cell partition walls depending from said top wall underside surface defining a plurality of cell chambers, means on the underside of said top surface defining an enclosed duct extending across said cell chambers, said duct being formed with openings communicating with respective of said cell chambers, whereby exhaust gas generated in the cell chambers flows through the respective duct openings into said common exhaust duct and thereupon to the atmosphere.

* * * * *

UNITED STATES PATENT AND TRADEMARK OFFICE
CERTIFICATE OF CORRECTION

PATENT NO. : 4,374,187
DATED : February 15, 1983
INVENTOR(S) : Ichiro Sano

It is certified that error appears in the above-identified patent and that said Letters Patent is hereby corrected as shown below:

Column 4, line 35, delete the word "rear".

Signed and Sealed this

Thirty-first Day of May 1983

[SEAL]

Attest:

DONALD J. QUIGG

Attesting Officer — Acting Commissioner of Patents and Trademarks